(12) United States Patent
Grahsl et al.

(10) Patent No.: US 11,561,392 B2
(45) Date of Patent: Jan. 24, 2023

(54) METHOD FOR GENERATING AND DISPLAYING A VIRTUAL OBJECT BY AN OPTICAL SYSTEM

(71) Applicant: VIEWPOINTSYSTEM GMBH, Vienna (AT)

(72) Inventors: Julian Grahsl, Vienna (AT); Michael Mörtenhuber, Traiskirchen (AT); Frank Linsenmaier, Weinstadt (DE)

(73) Assignee: VIEWPOINTSYSTEM GMBH, Vienna (AT)

( * ) Notice: Subject to any disclaimer, the term of this patent is extended or adjusted under 35 U.S.C. 154(b) by 0 days.

(21) Appl. No.: 17/416,736

(22) PCT Filed: Dec. 19, 2019

(86) PCT No.: PCT/EP2019/086307
§ 371 (c)(1),
(2) Date: Jun. 21, 2021

(87) PCT Pub. No.: WO2020/127732
PCT Pub. Date: Jun. 25, 2020

(65) Prior Publication Data
US 2022/0075187 A1 Mar. 10, 2022

(30) Foreign Application Priority Data

Dec. 19, 2018 (AT) .............. A 51133/2018

(51) Int. Cl.
*G02B 27/00* (2006.01)
*G02B 27/01* (2006.01)
*G06F 3/01* (2006.01)

(52) U.S. Cl.
CPC ..... *G02B 27/0093* (2013.01); *G02B 27/0101* (2013.01); *G02B 27/017* (2013.01);
(Continued)

(58) Field of Classification Search
CPC ............ G02B 27/0093; G02B 27/0101; G02B 27/017; G02B 27/0179; G02B 2027/011;
(Continued)

(56) References Cited

U.S. PATENT DOCUMENTS 8,878,749 B1 * 11/2014 Wu ................. G03B 29/00
351/209
8,950,864 B1 * 2/2015 Massengill .......... A61B 5/4064
382/117
(Continued)

FOREIGN PATENT DOCUMENTS

AT 513987 B1 9/2014
WO 2015024031 A1 2/2015

OTHER PUBLICATIONS

Office Action in Austria Application No. A 51133/2018, dated Aug. 30, 2019, 4 pages.
(Continued)

*Primary Examiner* — Benyam Ketema
(74) *Attorney, Agent, or Firm* — Tucker Ellis LLP

(57) ABSTRACT

The invention relates to a method for generating and displaying a virtual object to an individual user by an optical system consisting of gaze-tracking glasses and at least one display unit connected to the gaze-tracking glasses, the display unit having a first display, the gaze-tracking glasses having a first eye-tracking camera, the first display being arranged in a first viewing region of the gaze-tracking glasses. According to the invention, the optical system is adapted to an individual user, a first target value for adaptation of a display control unit of the display unit for controlling the first display being determined, a current viewing direction of the first eye being determined by the gaze-tracking glasses, a virtual object being generated and, taking account of the first target value, the virtual object
(Continued)

being displayed in the first display at a position in the determined viewing direction of the first eye.

16 Claims, 3 Drawing Sheets

(52) U.S. Cl.
CPC ......... *G02B 27/0179* (2013.01); *G06F 3/013* (2013.01); *G02B 2027/011* (2013.01); *G02B 2027/0138* (2013.01); *G02B 2027/0178* (2013.01); *G02B 2027/0187* (2013.01)

(58) Field of Classification Search
CPC .... G02B 2027/0138; G02B 2027/0178; G02B 27/01; G06F 3/013; H04N 13/344
See application file for complete search history.

(56) References Cited

U.S. PATENT DOCUMENTS

| | | | | |
|---|---|---|---|---|
| 9,171,198 | B1* | 10/2015 | Raffle | G06F 3/012 |
| 9,223,136 | B1* | 12/2015 | Braun | G06T 19/006 |
| 9,239,626 | B1* | 1/2016 | Wu | G06F 3/0304 |
| 10,078,377 | B2* | 9/2018 | Balan | G06F 3/011 |
| 10,248,192 | B2* | 4/2019 | Lehman | G02B 27/01 |
| 10,528,128 | B1* | 1/2020 | Yoon | G02B 27/0093 |
| 10,914,951 | B2* | 2/2021 | Liu | G02B 27/017 |
| 11,249,556 | B1* | 2/2022 | Schwarz | G06F 3/011 |
| 2006/0238877 | A1* | 10/2006 | Ashkenazi | G02B 27/0093 |
| | | | | 359/630 |
| 2013/0050432 | A1* | 2/2013 | Perez | G06F 3/011 |
| | | | | 348/47 |
| 2014/0081117 | A1* | 3/2014 | Kato | A61B 3/113 |
| | | | | 600/383 |
| 2014/0333665 | A1* | 11/2014 | Sylvan | G02B 7/12 |
| | | | | 345/633 |
| 2014/0368534 | A1* | 12/2014 | Salter | G06F 3/012 |
| | | | | 345/619 |
| 2015/0049201 | A1* | 2/2015 | Liu | H04L 12/1827 |
| | | | | 348/189 |
| 2015/0138417 | A1* | 5/2015 | Ratcliff | H04N 5/22525 |
| | | | | 348/333.03 |
| 2015/0339844 | A1 | 11/2015 | Liu et al. | |
| 2016/0162020 | A1* | 6/2016 | Lehman | G06F 3/013 |
| | | | | 715/835 |
| 2016/0262020 | A1* | 9/2016 | Zalzalah | H04W 36/0022 |
| 2016/0327798 | A1* | 11/2016 | Xiao | G02B 27/017 |
| 2016/0353094 | A1* | 12/2016 | Rougeaux | G06F 3/03547 |
| 2017/0127055 | A1* | 5/2017 | Khabiri | H04N 13/144 |
| 2017/0289518 | A1* | 10/2017 | Kim | H04N 13/239 |
| 2018/0143442 | A1* | 5/2018 | Gupta | H04N 13/344 |
| 2018/0157908 | A1* | 6/2018 | Sahlsten | G06V 40/19 |
| 2018/0180893 | A1* | 6/2018 | Gupta | G02B 27/0176 |
| 2018/0293798 | A1* | 10/2018 | Energin | G06F 40/169 |
| 2018/0300551 | A1* | 10/2018 | Luccin | G06V 20/20 |
| 2018/0300952 | A1* | 10/2018 | Evans | G06F 9/453 |
| 2018/0365490 | A1* | 12/2018 | Agrawal | G06V 40/197 |
| 2019/0179409 | A1* | 6/2019 | Jones | G02B 27/0176 |
| 2019/0187779 | A1* | 6/2019 | Miller | G08C 17/02 |
| 2019/0324530 | A1* | 10/2019 | Stellmach | G06F 3/017 |
| 2020/0012101 | A1* | 1/2020 | Yuki | H04N 5/64 |
| 2020/0026922 | A1* | 1/2020 | Pekelny | G06T 19/006 |
| 2020/0043236 | A1* | 2/2020 | Miller | G06F 3/012 |
| 2020/0066047 | A1* | 2/2020 | Karalis | G06T 19/006 |
| 2020/0073123 | A1* | 3/2020 | Martinez | G02B 27/288 |
| 2020/0209628 | A1* | 7/2020 | Sztuk | G02B 27/0176 |
| 2021/0183343 | A1* | 6/2021 | Beith | G06F 3/013 |
| 2021/0397253 | A1* | 12/2021 | Kocdemir | G06F 3/013 |

OTHER PUBLICATIONS

International Search Report and Written Opinion in International Application No. PCT/EP2019/086307, dated Mar. 10, 2020, 19 pages.

* cited by examiner

METHOD FOR GENERATING AND DISPLAYING A VIRTUAL OBJECT BY AN OPTICAL SYSTEM

CROSS-REFERENCE TO RELATED APPLICATIONS

The present application is a national phase application of PCT Application No. PCT/EP2019/086307, filed Dec. 19, 2019, entitled "METHOD FOR GENERATING AND DISPLAYING A VIRTUAL OBJECT BY AN OPTICAL SYSTEM", which claims the benefit of Austrian Patent Application No. 51133/2018, filed Dec. 19, 2018, each of which is incorporated by reference in its entirety.

BACKGROUND OF THE INVENTION

1. Field of the Invention

The invention relates to a method for generating and displaying a virtual object by an optical system.

2. Description of the Related Art

Glasses for so-called augmented reality as well as mixed reality are gaining increasingly more importance and popularity. In this case, data glasses display information to the user in the field of vision. Such glasses have at least one, at least partially transparent, display which is arranged before at least one eye of the user. In contrast with so-called virtual reality, there is always a direct relationship with the environment with augmented reality and mixed reality.

Numerous problems have occurred in the practical use of such glasses, such as Google glasses. Simply displaying information on the display, which is part of the glasses, has proven to be extremely disadvantageous. The viewing behavior of the user is changed significantly by the display of the content. The user is actually barely supported by the display of the information because the user's eyes are forced to continually switch between the displayed information and the environment. This quickly becomes tiresome and is a stress for the brain that should be taken seriously. The displayed content also distracts the user from the real environment because the optical attraction of a newly displayed piece of information diverts the eye of the user to this instead, regardless of whether there might be something more important needing more attention in the real world in another viewing direction. This has already led to accidents. Such glasses can thus have precisely the opposite effect than intended. Instead of making a situation easier for the user, such glasses increase the complexity. [05] In addition, all people are different to a certain extent. Human eyes are arranged respectively differently as relates to the nose and ears and respectively also have a different distance with respect to one another. All people who wear glasses know the corresponding adaptations to glasses made by an optician, in which the optician adapts the glasses to the respective conditions of the individual wearing the glasses through mechanical changes to the glasses, for example by bending the side pieces or the nose pad. Accordingly, optical lenses are also individually adapted for a user.

With the known systems for augmented reality or mixed reality, it has not yet been possible to combine the display of virtual objects with objects in the real world or to harmonize those in a definable and intentional manner

SUMMARY OF THE INVENTION

Thus, the object of the invention is to provide a method of the aforementioned type, with which the aforementioned disadvantages can be avoided and with which virtual objects can be displayed in a definable combination with the real environment.

According to the invention, this is achieved by means of the features described herein.

Content is thereby precisely displayed where a person is already looking at the particular point in time. The direction of view of a person is seldom random; rather, there are usually causes in the environment of the person in question. The display of a virtual object in data glasses is a different event and draws the attention of the user. In numerous situations, a user does not randomly look at a particular object in the user's environment, but because there is a particular reason. If an object appears in the data glasses thereof, the user automatically looks at this object. However, the user thereby loses reality from the view. In safety-critical environments, such as in industry or in a laboratory, this can lead to inattentiveness and accidents. Due to the fact that the content is displayed precisely where the user is already looking, the user does not have to change visual attention based on the display of content or of an image. The user can thereby respond to the real environment and to the displayed content equally. The user is thereby supported in the best-possible manner in mastering even the most difficult situations without being distracted or overburdened.

Data glasses, particularly an optical system consisting of gaze-tracking glasses and a display unit, can thereby be adapted to an individual user quickly and easily. It is thereby possible to display content not just anywhere on a display; rather, the particular optical system is adapted such that the corresponding content can be displayed where a user is looking. It is thereby possible to combine the display of virtual objects with objects in the real world or to harmonize those in a definable and intentional manner.

It can thereby be ensured that the content displayed on the display is in the actual viewing direction of the user or in a well-defined and intentionally selected position as relates to the actual viewing direction of the user.

The method according to the subject matter is quick and easy to implement in practice.

The dependent claims relate to further advantageous embodiments of the invention.

Express reference is hereby made to the wording of the claims, whereby the claims are included in the description at this juncture by reference and are being asserted as reflected in the wording.

BRIEF DESCRIPTION OF THE DRAWINGS

The invention is described in greater detail with reference to the attached drawings, in which only preferred embodiments are shown by way of example. The following is shown.

DETAILED DESCRIPTION

Figure 1:
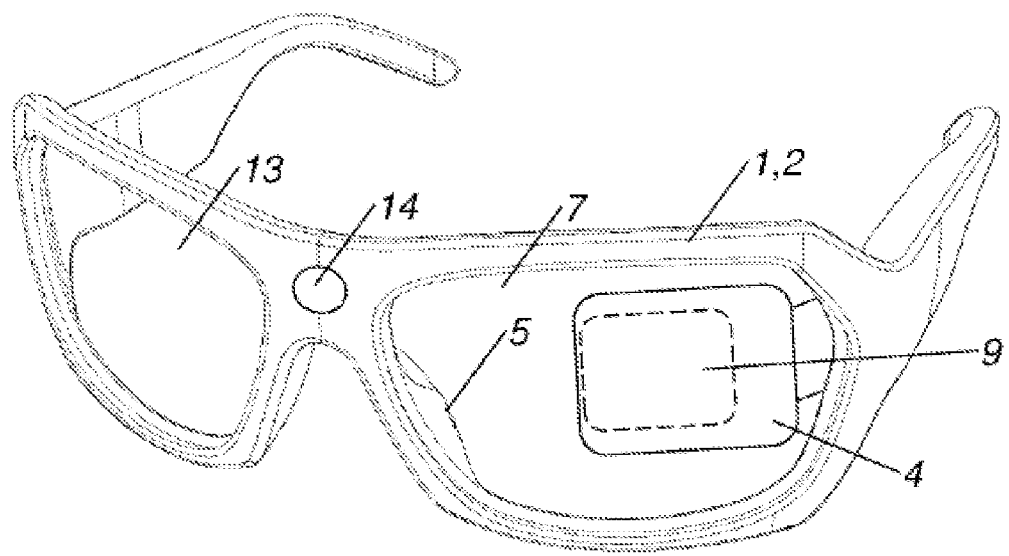
FIG. 1 a first embodiment of a system according to the subject matter comprising gaze-tracking glasses and a display unit, in a perspective view.
Figure 2:
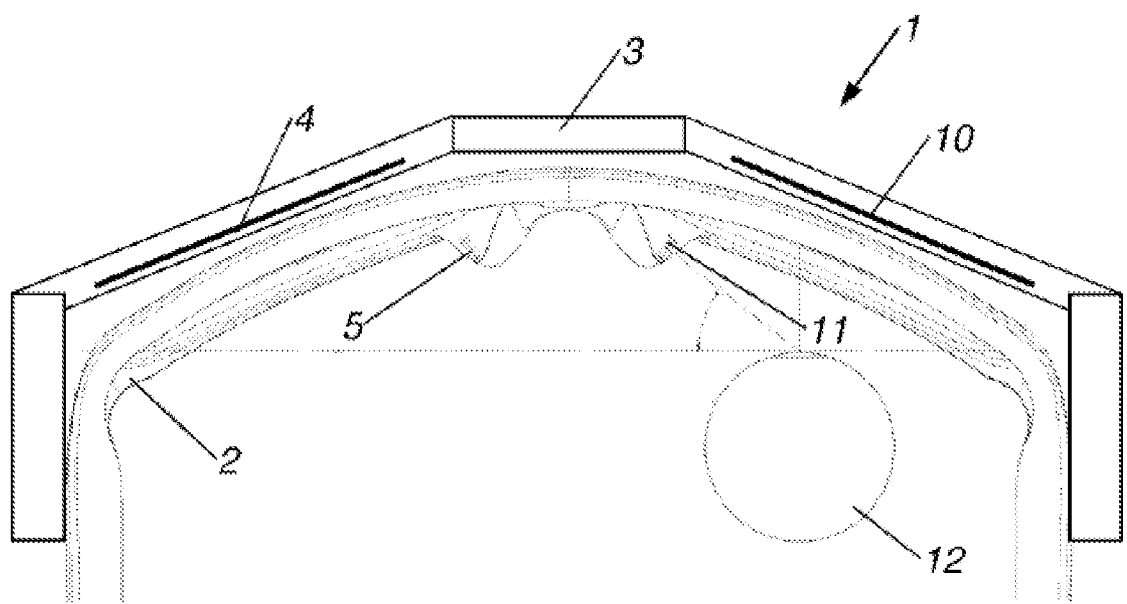
FIG. 2 a second embodiment of a system according to the subject matter comprising gaze-tracking glasses and a display unit, in an outline.
Figure 4:
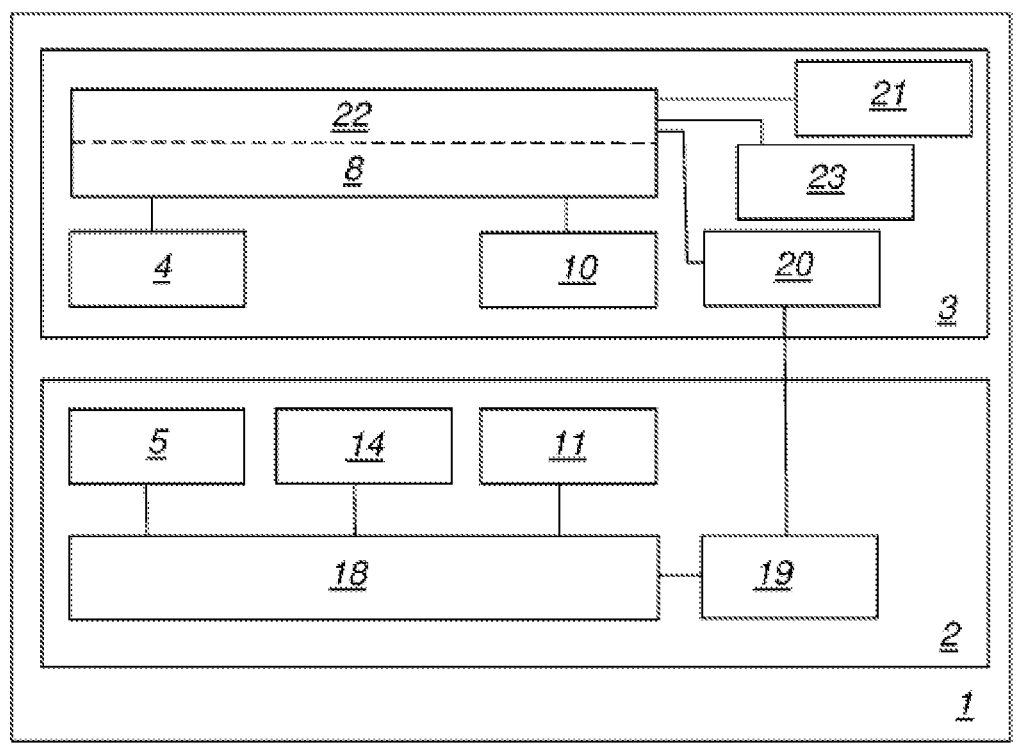
FIG. 4 a diagram of an embodiment of a system according to the subject matter comprising gaze-tracking glasses and a display unit.

FIGS. 1, 2, and 4 each show different embodiments or representations of an optical system 1, which is adapted to an individual user according to the subject matter. Furthermore, the optical system 1 according to the subject matter is used for the defined display of virtual objects 16 which are generated in response to a definable state or a definable event. These virtual objects 16 are shown in a defined visual environment in a definable position on at least one display 4, 10, of the system 1.

The optical system 1 consists at least of gaze-tracking glasses 2 and at least one display unit 3 connected to the gaze-tracking glasses 2.

The gaze-tracking glasses 2 have at least one first eye-tracking camera 5 for generating a first eye video of a first eye 6 of the user. Preferably, the gaze-tracking glasses 2 further have a second eye-tracking camera 11 for generating a second eye video for a second eye 12 of the user. The gaze-tracking glasses 2 preferably have at least one field-of-view camera 14, which is pointing forward, from the perspective of the user 1 wearing the gaze-tracking glasses 2. The at least one eye-tracking camera 5 or the preferably two eye-tracking cameras 5, 11 are arranged in so-called nose-piece frames of the gaze-tracking glasses 2. The arrangement of the two eye-tracking cameras 5, 11 can be seen very well in FIG. 2.

Especially preferably provided gaze-tracking glasses 2, as shown in FIGS. 1 and 2, are known from AT 513,987 B 1, which contains further details on the preferred gaze-tracking glasses 2. The methods of the subject matter may, however, also be carried out with other gaze-tracking glasses 2.

The gaze-tracking glasses 2 are provided and designed to detect viewing directions of the user.

FIG. 4 shows, among other things, a block diagram of the gaze-tracking glasses 2, in which, however, actually implemented gaze-tracking glasses 2 may have further components. In addition to the previously described eye-tracking cameras 5, 11, the gaze-tracking glasses 2 particularly have at least one controller 18 of the gaze-tracking glasses 2 as well as an interface 19 for communicating with the display unit 3. The gaze-tracking glasses 2, moreover, have preferably further components such as, for example, an energy supply unit.

The display unit 3 has at least one—at least—partially transparent first display 4, as is shown in FIG. 1. In particular, the display unit 3 also has a second display 10. The two displays 4, 10 may also be designed as a single part, in which, in this case, it is provided that the individual display extends over both eyes 6, 12. According to the subject matter, the first display 4 is consistently assigned to the left eye of the user, in which this is not a forcible stipulation; the right eye can also be designated as the first eye 6.

The display unit 3 is preferably a device which is independent from the gaze-tracking glasses 2, which is designed, however, to interact with a certain type of gaze-tracking glasses 2 and is arranged on these particular gaze-tracking glasses 2 in order to be mechanically connected thereto. According to the subject matter, the system 1 comprising gaze-tracking glasses 2 and a display unit 3 mechanically connected thereto is always used, in which a single-part design of the two devices 2, 3 may also be provided.

The first display 4 is arranged, at least in regions, in a first viewing region 7 of the gaze-tracking glasses 2. The preferably provided second display 10 is arranged, at least in regions, in a first viewing region 13 of the gaze-tracking glasses 2. The viewing region 7, 13 in this case is understood to be within the line of sight or the optical field of vision of a user. In particular, the viewing regions 7, 13 are identical to the lens-receptacle openings in the gaze-tracking glasses 2. To the extent that these are not lenses as such and/or do not have any or only partially formed frames, the viewing regions 7, 13 are particularly the regions at which the lenses would typically be arranged in conventional glasses.

The first and possibly the second display 4, 10 may be arranged on the side of the gaze-tracking glasses 2 facing the user, as shown in FIG. 1, or the side of the gaze-tracking glasses 2 facing away from the user, as shown in FIG. 2. Moreover, they may also be arranged in the gaze-tracking glasses 2.

The first and possibly the second display 4, 10 are arranged positionally fixed on the display unit 3. There is no provision for them to tilt or swivel during operation. The display unit 3 also has no corresponding actuators.

The first and possibly the second display 4, 10 are preferably designed as so-called wave guide displays and are substantially transparent.

The first and possibly the second display 4, 10 are preferably designed as so-called single-focal-plane displays. In this case, the display only has a single display plane. In contrast, there are also so-called multiple-focal-plane displays known, which are not being used according to the subject matter.

FIG. 4 shows, among other things, a block diagram of the display unit 3, in which, however, an actually implemented display unit 3 may have further components. In addition to the previously described displays 4, 10, the display unit 3 further has at least one controller 22 of the display unit 3 as well as a first interface 20 of the display unit 3 for communicating with the gaze-tracking glasses 2.

Furthermore, the display unit 3 has a display control unit 8, which is connected to the controller 22 or is formed integrally therewith. The display control unit 8 controls the first and the preferably provided second display 4, 10 and is responsible for the position and distortions of an image or of an object 16 to be displayed on the first and preferably second displays 4, 10. The image or object 16 is generated by the controller 22 and transferred to the display control unit 8 for display.

The display unit 3 further has a second interface 21 of the display unit 3, which is provided for communication with the environment and designed accordingly. Accordingly, suitable and/or preferred transfer methods or systems are currently widely known and used and are characterized in the cellular telephone industry as 3G (UMTS), 4G (LTE), or 5G, in which further systems from the Internet or WLAN may also be used.

Further corresponding protocols are, for example, IEEE 802 with numerous variants.

Furthermore, the display unit 3 preferably has a navigation and position-determination unit 23, which is connected to the controller 22. Corresponding units are known as smart phones. The navigation and position-determination unit 23 can determine both the position of the display unit 3 in a global coordinate system, particularly by means of satellite navigation methods as well as possibly with the inclusion of the connection data of a cellular telephone provider, as well as the spatial position or alignment of the display unit 3, particularly by means of at least one tilt sensor.

The display unit 3, moreover, has preferably further components such as, for example, an energy supply unit.

Because slight, individual deviations from the dimensional specifications can occur during production of the gaze-tracking glasses 2 and/or the display unit 3, it is preferably provided that the individual position and alignment of the first eye-tracking camera 5 and/or the second eye-tracking camera 11 of each individual pair of gaze-tracking glasses 2 can be determined on a measuring stand—before delivery—and the corresponding data can be stored in a memory or the controller 18 of the respective gaze-tracking glasses 2.

Furthermore, it is preferably provided that—likewise respectively individually—at least one value is determined on the measuring stand for at least one definable optical error in the first eye-tracking camera 5 and/or the second eye-tracking camera 11 and that the at least one determined value is likewise stored in the memory or the controller 18 and considered in the subsequently described method steps.

It is further preferably provided that also the individual position and alignment of the first display 4 as well as of the preferably provided second display 10 of every single display unit 3 is determined individually on a measuring stand, and the data determined while doing so is stored in the controller 22 of the respective display unit 3. These data are preferably considered in the subsequently described method steps.

The previously described determination of the actual dimensions and optical errors takes place before the transfer of the respective gaze-tracking glasses 2 and/or the respective display unit 3 to the user. This is also characterized as intrinsic calibration.

Within the scope of the method according to the subject matter for generating and displaying a virtual object 16 by an optical system, it is provided that the optical system 1 is adapted to an individual user. This comprises at least the following steps:

The user puts on the gaze-tracking glasses 2.

Subsequently, at least one definable eye dimension and/or at least one definable eye position of the first eye 6 is determined by the gaze-tracking glasses 2.

Afterwards, at least one first target value of at least one geometric display setting of the first display 4 is determined from the at least one determined eye dimension and/or the at least one determined eye position as well as the position and alignment of the first eye-tracking camera 5.

A display control unit 8 of the display unit 3 is then adapted at least to the first target value in order to control the first display 4.

An individual optical system 1 according to the subject matter for augmented or mixed reality can thereby be quickly and easily adapted to an individual user. It is thereby possible to display content not just anywhere on a display 4, 10; rather, the particular optical system 1 is adapted such that the corresponding content can be displayed where a user is already looking. It is thereby, furthermore, also possible to combine the display of virtual objects 16 with real objects 15 in the real world or to harmonize those in a definable and intentional manner.

It can thereby be ensured that the content displayed on the display 4, 10 is in the actual viewing direction of the user or in a well-defined and intentionally selected position and/or distortion as relates to the actual viewing direction of the user.

It may be provided that a corresponding adaptation or calibration is only carried out once for an individual optical system 1 in order to adapt it to a particular user. It is preferably provided that the adaptation is repeated in definable time intervals.

The listed method steps are only necessary for one eye 6 and only executable for one eye 6. This relates to a user, for example, with only one eye 6 or situations in which only one eye 6 is used.

Preferably, the method or methods according to the subject matter are provided for both eyes 6, 12 of a user. Therefore, the methods according to the subject matter are subsequently described particularly for two eyes 6, 12, in which all method steps, which can also be executed with or for only one eye 6, are also provided as such for only one eye 6.

The method according to the subject matter thus has the following further method steps in the preferred basic variant:

At least one definable eye dimension and/or at least one definable eye position of the second eye 12 is determined by the gaze-tracking glasses 2.

Afterwards, at least one second target value of at least one geometric display setting of the second display 10 is determined from the at least one determined eye dimension and/or the at least one determined eye position as well as the position and alignment of the second eye-tracking camera 11.

The display control unit 8 is then adapted at least to the second target value in order to control the second display 10.

The individual steps are explained in detail as follows.

The placement of the gaze-tracking glasses 2 is identical to the placement of any other glasses, is generally known, and requires no further explanation. The display unit 3 connected to the gaze-tracking glasses 2 is placed at the same time.

Following the placement of the gaze-tracking glasses 2, at least one definable eye dimension and/or at least one definable eye position of the first eye 6 and preferably also of the second eye 12 is/are determined by the gaze-tracking glasses 2. Eye dimensions are particularly the diameter and/or the radius of the eye as well as the pupil diameter in addition. Preferably both are determined. Eye positions are particularly the position of the pupils of the eyes 6, 12, particularly the distance between the two pupils, as well as the spatial position of the two eyes 6, 12 as relates to one another. Preferably both are determined.

In order to determine the eye positions of the first eye 6 and of the second eye 12, it is particularly provided that a position of a median of the eyes 6, 12 is determined. The median is characterized as a centerline of the body or of the head in the region of the eyes 6, 12. To this end, the position of the first eye-tracking camera 5 and of the second eye-tracking camera 11 is, furthermore, determined as relates to the median of the eyes 6, 12.

In order to determine the eye positions or the eye dimensions, it is preferably provided that at least one viewing pattern sequence of the user is recorded at a definable plurality of defined control points. The viewing pattern sequence or viewing sequence in this case characterizes the viewing behavior of the user who is encouraged, starting from a certain location, to look at certain control points or to move his/her head in a definable manner during the fixation of a control point. It is preferably provided that the control points are arranged at different spaces and distances away from the optical system 1. The resulting advantages will be addressed at a later point in the document.

After the determination of the eye dimensions as well as the eye positions, it is provided that at least one first target value of at least one geometric display setting of the first display 4 is determined from the at least one determined eye dimension and/or the at least one determined eye position as well as the position and alignment of the first eye-tracking camera 5. It is further preferably provided that at least one second target value of at least one geometric display setting of the second display 10 is determined from the at least one determined eye dimension and/or the at least one determined eye position as well as the position and alignment of the second eye-tracking camera 11.

During this method step, values or parameters are thus determined which are characterized as target values. These target values indicate the position at which and/or the distortion with which an image or a virtual object 16 must be displayed within the display regions of the respective displays 4, 10 so that it must be displayed for the user, who is looking at displays 4, 10 arranged before the eyes 6, 12, so as to ensure that it is then displayed for the user at a very particular or defined location as well as substantially without distortion. In particular, the target values are not individual values but groups or quantities of values or vectors. It is particularly provided in this case that respectively different target values are determined, stored, and considered for various eye positions that normally occur at different observation distances.

Figure 3:
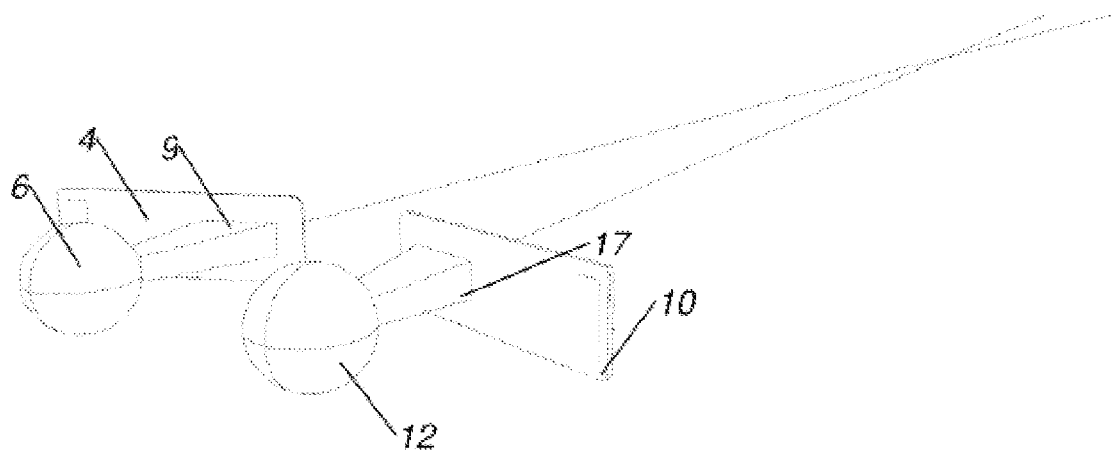
FIG. 3 a schematic perspective view of the spatial arrangement of a first and a second display opposite the eyes of a user.

FIG. 3 shows a corresponding view of only the eyes 6, 12 as well as the two displays 4, 10.

Accordingly, the geometric display setting is at least one setting which relates to the geometric display of an object on the display but not the color or contrast thereof, however. The geometric display setting thus relates to orientation or position, distortion, and size of a displayed object 16 within a display region of the respective display 4, 10.

After the first as well as preferably the second target value are determined, the display control unit 8 of the display unit 3 is adapted to at least the first target value in order to control the first display 4 and adapted to at least one second target value in order to control the second display 10. The adaptation of the display control unit 8 means that the objects to be displayed are shown to the user in the manner such that—relative to the eyes 6, 12 of the user—they are actually displayed where they are also supposed to appear and have the necessary distortion level to appear undistorted.

The necessary degree of distortion as well as the desired position are also not constant across all viewing states for an individual user. In particular, they change with the distance of a point at which the user is looking. Thus, as already indicated, it is especially preferably provided within the scope of determining the eye dimensions and/or the eye positions that first distance values of the first target value and of the second target value are determined at a first control point which is arranged at a first distance away from the optical system 1 and that second distance values of the first target value and of the second target value are determined at a second control point which is arranged at a second distance away from the optical system 1, in which the first distance is different than the second distance. Thus, different values or amounts of the first target value and of the second target value are determined for different focusing distances of the first and second eye 6, 12 or for different positions of the eyes 6, 12 as relates to one another. In particular, it is provided that control points are arranged at least four different distances. A corresponding curve can be extrapolated over the focusing distance from the determined distance values and stored for the future display of virtual objects 16 at particular eye positions.

The type of target values is directly related to the type of displays 4, 10 used. Displays 4, 10 often have basic settings, which are also characterized as default settings. A corresponding image or video is shown according to the default settings without intentionally changing or adapting the video signals which are fed to such a display. The corresponding image will thereby normally be shown undistorted in the middle of the respective display.

Thus, it is especially preferably provided that a first target position and/or a first target distortion of a first display region 9 for displaying a virtual object 16 before the first eye 6 is determined as a first target value of the geometric display setting, in which, starting from at least one deviation of the first target position and/or the first target distortion of the first display region 9, at least one first correction factor and/or one first correction function is determined for a first display region default setting of the first display 4, in which the display control unit 8 is adapted to the user at least with the first correction factor or the first correction function. The first display region 9 in this case is a subregion within the first display 4.

Accordingly, it is preferably provided for the second eye that a second target position and/or a second target distortion of a second display region 17 for displaying a virtual object 16 before the second eye 12 is determined as a second target value of the geometric display setting, in which, starting from at least one deviation of the second target position and/or the second target distortion of the second display region 17, at least one second correction factor and/or one second correction function is determined for a second display region default setting of the second display 10, in which the display control unit 8 is adapted to the user at least with the second correction factor or the second correction function. The second display region 17 in this case is a subregion within the second display 10.

In the aforementioned context, a correction function establishes a relationship between certain eye positions and/or viewing directions of the user and the respectively provided correction factors for the display of a virtual object under the respective conditions. Eyes are capable of making quasi-continual position changes. It has been shown that the values of the correction factors show precisely such quasi-continual behavior.

A simple adaptation of the displays 4, 10 or the display control unit 8 is made possible due to the aforementioned use of correction factors or correction functions. It is especially preferably provided in this case to record the correction factors or correction functions as a field with different distance values.

FIG. 3 clearly shows how the respective display regions 9, 17 for the two eyes shown deviate significantly from the respective centers of the two displays 4, 10.

The display of a virtual object 16 in a definable relationship as relates to the viewing direction or viewing behavior of the user is enabled by the adaptation of the optical system 1 implemented according to the subject matter. In particular, it is thereby possible to display a virtual object 16 in a definable relationship together with a real object 15.

Once the described optical system 1 has been adapted or calibrated to the user according to the described methods, additional virtual objects 16 can be generated and displayed.

The following additional method steps are provided with the method for generating and displaying a virtual object 16 by an optical system 1:

A current viewing direction of the first eye 6 is determined by the gaze-tracking glasses 2.

A virtual object 16 is generated in response to a definable state and/or a definable event.

The virtual object 16 is displayed by the display control unit 8, taking into account the first target value, at a position on the first display 4 in the determined viewing direction of the first eye 6.

As previously indicated, the use of two displays 4, 10 is particularly provided. In this case, it is particularly further provided that the following further method steps are implemented simultaneously with the aforementioned method steps, with correspondingly adapted or calibrated gaze-tracking glasses 2:

A current viewing direction of the second eye 12 is determined by the gaze-tracking glasses 2.

The virtual object 16 is displayed by the display control unit 8, taking into account the first target value, at a position on the second display 10 in the determined viewing direction of the second eye 12.

When displays 4, 10 are used with default settings, it is particularly provided that the virtual object 16 is displayed on the first display 4 offset and/or distorted by the first correction factor and/or the first correction function as well as preferably that the virtual object 16 is displayed on the second display 10 offset and/or distorted by the second correction factor and/or the second correction function.

It is provided that the virtual object is displayed at a position in the determined viewing direction of the first eye 6 or of the second eye 12. In this case, it is provided that the relevant position of the display moves along with the viewing direction or is shifted accordingly. In this context, it is thus preferably provided that the gaze-tracking glasses 2 continually determine the current viewing direction of the first eye 6 and/or of the second eye 12, and that the position at which the virtual object 16 is shown is continually adapted to the current viewing direction or the current viewing directions.

Because at least one of the eyes 6, 12 can make certain slight, unintentional movements when viewing the virtual object 16, said movements being recorded respectively by the gaze-tracking glasses 2, direct following of the display position may lead to a continual movement of same which the user perceives as being unsettling or shaky. In order to avoid this, it may be provided that the current viewing direction must deviate by a definable amount, particularly by 2° (two degrees), from a most recently determined viewing direction so that the position at which the virtual object 16 is displayed is adapted to the current viewing direction.

Alternatively, it may be provided that the respectively determined viewing directions are averaged over a certain timeframe or a definable period in the past, and the position at which the virtual object 16 is displayed lies in the averaged viewing direction. The length of time in the past in this case can be adapted depending on the situation. Preferably, the length of time in the past amounts to about 0.1 to 0.3 s (seconds).

The virtual object 16 is generated and displayed when a definable state and/or a definable event occurs. In this case, such a state or such an event may only be considered as having occurred when a definable plurality of criteria is respectively fulfilled.

According to a first preferred variant, it is provided that the optical system has at least one field-of-view camera 14, in which a definable real object 15 is detected by the field-of-view camera 14, in which the detecting of the definable real object 15 is the definable event or a criterion for a corresponding event for generating the virtual object 16. A user can thereby be supported, for example, in orientating in the real world. Detection of a real object 15 is already possible by means of corresponding image-processing programs. In this context, the detection of a face may also be provided.

According to a second preferred variant, it is provided that the system is designed for the detection of at least one state value of the user, that the state value is monitored by the system with respect to the exceeding of a limit value, and that an exceeding of the limit value is the definable event for generating the virtual object 16. For example, a fatigue value can be determined for a waking/fatigued state of the user from observing and evaluating the viewing behavior, to which end no further sensors are necessary.

It may further be provided that the optical system 1 has at least one further sensor for determining a physiological variable of the user, particularly heartbeat and/or skin conductance, and/or is connected to a corresponding external sensor in order to display the values thereof.

For example, the optical system 1 may also be connected to a blood pressure sensor. Corresponding external sensors may also be sensors which record the bodily functions of living beings other than the user. For example, coaches can thus be informed of a critical state of one of their athletes. Furthermore, the at least one sensor may also be a sensor of a technical apparatus.

According to a third preferred variant, it is provided that the system has at least one navigation and position-determination unit 23 for detecting a spatial alignment as well as a location of the system 1 and that a definable location as well as a definable spatial alignment represent the definable event for generating the virtual object 16. The detection of a spatial alignment as well as a location of the system 1 can particularly be supported by means of so-called location-based services, as they are known in the smart phone field.

Figure 5:
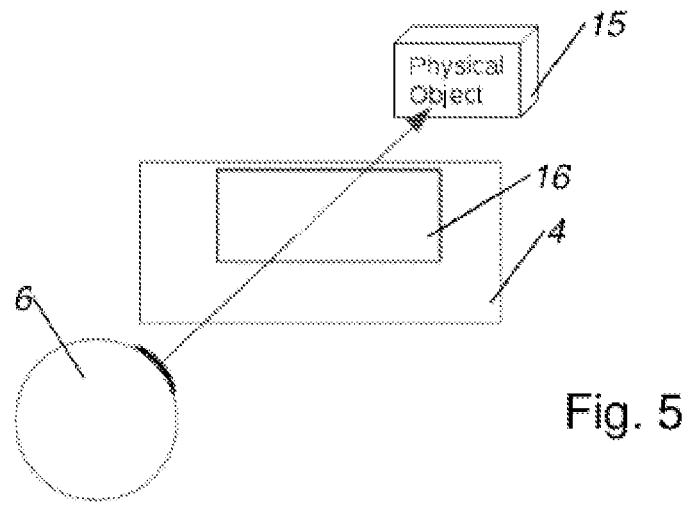
FIG. 5 a schematic perspective view of the spatial arrangement of a first display, of a first eye, as well as of a real object (physical object)
Figure 6:
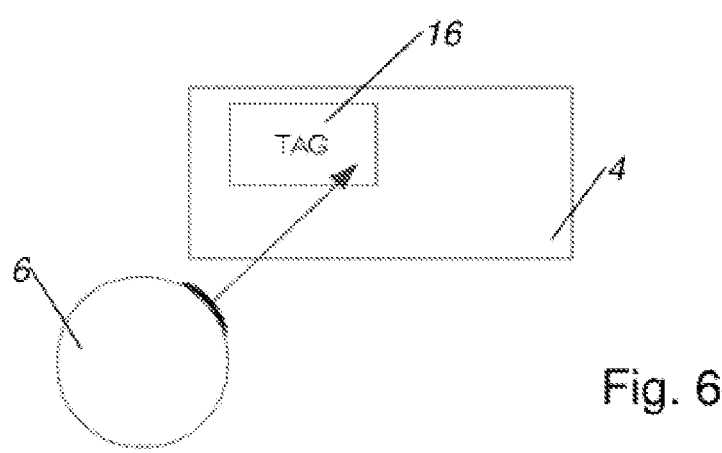
FIG. 6 the arrangement comprising a first display and first eye according to FIG. 5 with a virtual object (TAG) shown on the first display.
Figure 7:
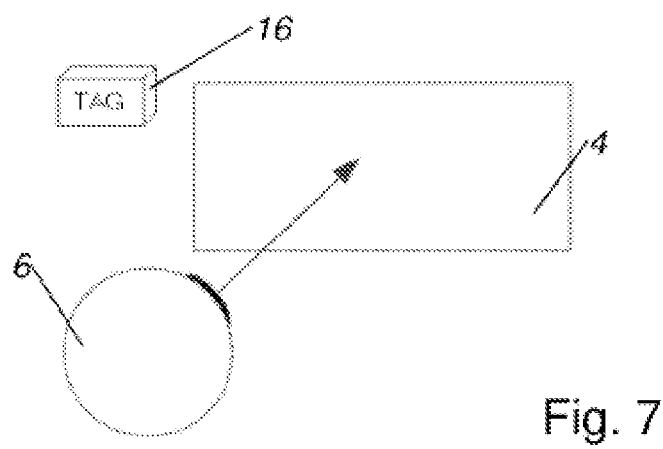
FIG. 7 the arrangement comprising a first display and first eye according to FIG. 5 with a virtual object (TAG) arranged outside of the first display and not shown.

FIGS. 5 to 7 show examples of the display of virtual objects 16 as relates to a real object 15, in which it is insignificant whether this real object 15 is simply just there or has also been detected as an object 15. In this case, FIG. 5 shows the first eye 6 of the user, who is looking at the real object 15 through the first display 4, the object being characterized in FIG. 5 as a physical object. According to an especially simple response, a virtual object 16 is shown on the display 4 in the form of a frame such that this virtual object 16 borders the real object 15 and the frame appears to be substantially rectangular.

FIG. 6 shows a similar situation in which, however, no real object 15 is shown. Instead of the border, a different virtual object 16 is then shown in the form of a TAG. The TAG in question is shown adjacent to the viewing direction. Because it is clearly known where the user is looking due to the gaze-tracking glasses 2, the virtual object can be positioned in or next to the viewing direction such that it can be detected or seen by the user without any significant change in the viewing direction.

FIG. 7 shows the effects on the virtual object 16 or the TAG when the user looks away from it or in the direction of a different item. The particular virtual object 16 in this case retains its assigned position in space. Because it is then outside of the display region 9 of the display 4, it is also no longer shown. As soon as the user has moved sufficiently in the corresponding direction, the virtual object 16 will also again be displayed.

It is preferably provided that a focusing distance of the two eyes 6, 12 of the user is determined by the gaze-tracking glasses 2 when the user looks at the real object 15 and that the virtual object 16 is shown positionally offset and/or distorted on the first and second display 4, 10 such that it appears as a single object at the same focusing distance of the two eyes 6, 12 as the real object 15. Thus, the virtual object 16 is shown on the displays 4, 10 which are arranged directly before the eyes 6, 12 of the user; however, the eyes 6, 12 of the user see the virtual object 16 at the same distance as the real object 15 to which it is assigned. This eliminates the otherwise continually necessary refocusing at different distances.

It is thus provided that the virtual object 16 is shown as a so-called stereo image.

The focusing distance of the two eyes 6, 12 is determined by the gaze-tracking glasses such that the angular positions of the eyes 6, 12 are determined and the distance at which the eyes 6, 12 will focus is calculated therefrom. In this case, a distance value does not have to be determined in a unit of length. The focusing distance can also be determined and processed in the form of an angle or several angles. In other words, the gaze-tracking glasses 2 thus determine a current position of the two eyes, and the virtual object 16 is shown positionally offset and/or distorted on the first and second display 4, 10 such that it appears as a single object at the distance at which the two eyes 6, 12 are oriented.

The system 1 according to the subject matter preferably does not have a separate distance meter for determining a distance between the system 1 and the real object 15.

In this case, it is particularly provided that the display control unit 8 has at least one distance value of the first target value and of the second target value taken into account, the distance value corresponding to the focusing distance of the two eyes 6, 12, in order to display the virtual object 16 on the first and second display 4, 10. In the event that no distance value or distance values of the first target value and of the second target value are stored, it is provided that the display control unit 8 interpolates between the two neighboring distance values.

The invention claimed is:

1. A method for generating and displaying a virtual object by an optical system, comprising:
    detecting viewing directions of a user by gaze-tracking glasses of the optical system, at least one display unit being connected to the gaze-tracking glasses, the display unit having at least one at least partially transparent first display, the gaze-tracking glasses having a first eye-tracking camera for generating a first eye video of a first eye of the user, the first display being arranged, at least in regions, in a first viewing region of the gaze-tracking glasses, the viewing region being assigned to the first eye; and
    adapting the optical system to the user by, repeatedly at predetermined intervals and for different positions of the first eye of the user:
    determining, by the gaze-tracking glasses, at least one of at least one definable eye dimension and at least one definable eye position of the first eye;
    determining at least one first target value of at least one geometric display setting of the first display from the at least one of the at least one determined eye dimension and the at least one determined eye position, and a position and an alignment of the first eye-tracking camera, wherein the at least one first target value indicates and/or a distortion with which an image or a virtual object is to be displayed within a display region of the first display;
    controlling the first display by adapting a display control unit of the display unit at least to the first target value;
    determining a current viewing direction of the first eye by the gaze-tracking glasses;
    generating a virtual object in response to at least one of a definable state and a definable event; and
    displaying the virtual object by the display control unit, taking into account the first target value, at a position on the first display in a determined viewing direction of the first eye.

2. The method according to claim 1, wherein the gaze-tracking glasses continually determine the current viewing direction of the first eye and in that the position at which the virtual object is displayed is continually adapted to the current viewing direction.

3. The method according to claim 1, wherein the current viewing direction deviates by a definable amount from a most recently determined viewing direction so that the position at which the virtual object is displayed is adapted to the current viewing direction.

4. The method according to claim 3, wherein the current viewing direction deviate by 2 degrees from the most recently determined viewing direction.

5. The method according to claim 1, further comprising:
    determining at least one of a first target position and a first target distortion of a first display region for displaying a virtual object before the first eye is within the first display as a first target value of the geometric display setting;
    determining, starting from at least one deviation of at least one of the first target position and the first target distortion of the first display region, at least one of at least one first correction factor and one first correction function for a first display region default setting of the first display; and
    adapting the display control unit to the user at least with the first correction factor or the first correction function,
    wherein the virtual object comprises at least one of displayed on the first display offset and distorted by at least one of the first correction factor and the first correction function.

6. The method according to claim 1, wherein the display unit has at least one partially transparent second display, wherein the gaze-tracking glasses have a second eye-tracking camera for generating a second eye video of a second eye of the user, wherein the second display is arranged, at least in regions, in a second viewing region of the gaze-tracking glasses, the viewing region being assigned to the second eye,
    wherein at least one definable eye dimension and/or at least one definable eye position of the second eye is determined by the gaze-tracking glasses,
    wherein afterwards at least one second target value of at least one geometric display setting of the second display is determined from at least one of the at least one determined eye dimension and the at least one determined eye position, and the position and alignment of the second eye-tracking camera,
    and wherein the display control unit is then adapted at least to the second target value in order to control the second display.

7. The method according to claim 6, wherein:
    a current viewing direction of the second eye is determined by the gaze-tracking glasses; and the virtual object is displayed by the display control unit, taking into account the second target value, at a position on the second display in the determined viewing direction of the second eye.

8. The method according to claim 6, further comprising:
determining at least one of a second target position and a second target distortion of a second display region for displaying a virtual object before the second eye is within the second display as a second target value of the geometric display setting;
determining, starting from at least one of at least one deviation of the second target position and the second target distortion of the second display region, at least one of at least one second correction factor and one second correction function for a second display region default setting of the second display; and
adapting the display control unit to the user at least with the second correction factor or the second correction function,
wherein the virtual object comprises at least one of displayed on the second display offset and distorted by at least one of the second correction factor and the second correction function.

9. The method according to claim 6, wherein, during the determination of the eye positions of the first eye and of the second eye, a position of a median of the eyes is determined, and the position of the first eye-tracking camera and of the second eye-tracking camera is furthermore determined as relates to the median of the eyes by means of the gaze-tracking glasses.

10. The method according to claim 1, wherein, for the adaptation to the user, at least one viewing pattern sequence of the user is recorded at a definable plurality of defined control points which is arranged at different spaces and distances away from the optical system.

11. The method according to claim 10, wherein first distance values of the first target value and of the second target value are determined at a first control point which is arranged at a first distance away from the optical system, and in that second distance values of the first target value and of the second target value are determined at a second control point which is arranged at a second distance away from the optical system, wherein the first distance is different than the second distance.

12. The method according to claim 10, wherein the gaze-tracking glasses determine current positions of the two eyes, and in that the virtual object is shown at least one of positionally offset and distorted on the first and second display such that it appears as a single object at the distance at which the two eyes are oriented.

13. The method according to claim 1, wherein the optical system has at least one field-of-view camera, wherein a definable real object is detected by the field-of-view camera, wherein the detecting of the definable real object is the definable event for generating the virtual object.

14. The method according to claim 1, wherein the system is adapted to detect at least one state value of the user, in that the state value is monitored by the system with respect to the exceeding of a limit value, and in that an exceeding of the limit value is the definable event for generating the virtual object.

15. The method according to claim 14, wherein the least one state value of the user is a fatigued state.

16. The method according to claim 1, wherein the system comprises at least one navigation and position-determination unit adapted to detect a spatial alignment and a location of the system, and in that a definable location and a definable spatial alignment represent the definable event for generating the virtual object.

* * * * *